(12) United States Patent
Reybet-Degat et al.

(10) Patent No.: US 11,276,254 B2
(45) Date of Patent: Mar. 15, 2022

(54) AIRCRAFT LOGBOOK MANAGEMENT

(71) Applicant: THALES, Courbevoie (FR)

(72) Inventors: Marion Reybet-Degat, Toulouse (FR); François Fournier, Toulouse (FR)

(73) Assignee: THALES, Courbevoie (FR)

( * ) Notice: Subject to any disclaimer, the term of this patent is extended or adjusted under 35 U.S.C. 154(b) by 714 days.

(21) Appl. No.: 15/839,620

(22) Filed: Dec. 12, 2017

(65) Prior Publication Data

US 2018/0165892 A1 Jun. 14, 2018

(30) Foreign Application Priority Data

Dec. 13, 2016 (FR) ...................................... 1601768

(51) Int. Cl.
| | | |
|---|---|---|
| *G06F 16/00* | (2019.01) | |
| *G07C 5/00* | (2006.01) | |
| *G07C 5/08* | (2006.01) | |
| *H04L 67/12* | (2022.01) | |
| *G06F 21/62* | (2013.01) | |

(Continued)

(52) U.S. Cl.
CPC ................ *G07C 5/008* (2013.01); *B64F 5/60* (2017.01); *G06F 21/6218* (2013.01); *G07C 5/085* (2013.01); *G07C 5/0816* (2013.01); *H04L 67/12* (2013.01); *G06F 2221/2137* (2013.01); *G06F 2221/2141* (2013.01); *G06F 2221/2147* (2013.01); *G06Q 50/30* (2013.01)

(58) Field of Classification Search
CPC ...... G07C 5/008; G07C 5/085; G07C 5/0816; G06F 21/6218; G06F 2221/2141; G06F 2221/2137; G06F 2221/2147; G06F 16/23; B64F 5/60; H04L 67/12; G06Q 50/30

USPC .......................................................... 707/783
See application file for complete search history.

(56) References Cited

U.S. PATENT DOCUMENTS 6,278,913 B1 * 8/2001 Jiang .................... G07C 5/0858
244/158.1
8,185,609 B2 * 5/2012 Fuchs .................. G06F 11/0739
709/218

(Continued)

OTHER PUBLICATIONS

Meng Yue et al., "The Approach of ACARS Data Encryption and Authentication," IEEE 2010 International Conference on Computational Intelligence and Security, Dec. 11, 2010, pp. 556-560, XP031856285.

(Continued)

*Primary Examiner* — Thanh-Ha Dang
(74) *Attorney, Agent, or Firm* — BakerHostetler (57) ABSTRACT

A method for managing an electronic logbook of an aircraft, comprises the steps of agreeing or refusing a read and/or write request by a client post as a function of predefined criteria comprising criteria associated with predefined time intervals and network connectivity criteria. Developments describe the management of a degraded mode (for example in case of interruption and/or of the restoral of network connectivity, e.g. with notification of the client posts and/or local backup saves), criteria further dependent on that part of the electronic logbook designated by the read and/or write request, security levels and/or priority levels. Encryption, integrity verification, network quality of service and distributed database aspects are described. Software and system aspects are described.

20 Claims, 4 Drawing Sheets

(51) Int. Cl.
*B64F 5/60* (2017.01)
*G06Q 50/30* (2012.01)

(56) References Cited

U.S. PATENT DOCUMENTS

| | | | | |
|---|---|---|---|---|
| 8,341,413 | B2* | 12/2012 | Belmonte | H04W 12/108 |
| | | | | 713/176 |
| 8,700,236 | B1* | 4/2014 | Berman | G07C 5/008 |
| | | | | 701/16 |
| 8,811,616 | B2* | 8/2014 | Cabos | H04L 9/0825 |
| | | | | 380/270 |
| 8,981,967 | B1* | 3/2015 | Shore | B64F 5/00 |
| | | | | 340/945 |
| 9,232,345 | B1* | 1/2016 | Rencher | H04W 12/08 |
| 9,284,045 | B1* | 3/2016 | Springer | B64D 43/00 |
| 2002/0103865 | A1* | 8/2002 | Lilly | H04L 67/42 |
| | | | | 709/205 |
| 2002/0123915 | A1* | 9/2002 | Denning | G06Q 10/06 |
| | | | | 705/7.11 |
| 2002/0169746 | A1* | 11/2002 | Cowman | G06F 16/93 |
| 2003/0032426 | A1* | 2/2003 | Gilbert | H04W 84/02 |
| | | | | 455/427 |
| 2007/0028089 | A1* | 2/2007 | Yukawa | G07C 5/008 |
| | | | | 713/151 |
| 2007/0129973 | A1* | 6/2007 | Wollenberg | G06Q 10/10 |
| | | | | 705/5 |
| 2009/0265056 | A1* | 10/2009 | Yukawa | G01C 23/00 |
| | | | | 701/31.4 |
| 2009/0265357 | A1* | 10/2009 | Yukawa | G06F 16/00 |
| 2010/0121938 | A1* | 5/2010 | Saugnac | H04M 3/22 |
| | | | | 709/218 |
| 2010/0268413 | A1* | 10/2010 | Bamesberger | G06F 11/34 |
| | | | | 701/31.4 |
| 2012/0197516 | A1* | 8/2012 | Shukla | G08G 5/065 |
| | | | | 701/120 |
| 2015/0212701 | A1* | 7/2015 | Rodney | G08G 5/0021 |
| | | | | 715/771 |
| 2015/0243112 | A1 | 8/2015 | Jensen et al. | |
| 2017/0357618 | A1* | 12/2017 | Hamblin | G06Q 10/06 |

OTHER PUBLICATIONS

"Draft 3 of ARNIC project paper 664: Aircraft data network, Part 5: Network domain characteristics and interconnection," AECC: Airlines Electronic Engineering Committee, Nov. 4, 2004, XP002398177.

* cited by examiner

AIRCRAFT LOGBOOK MANAGEMENT

CROSS-REFERENCE TO RELATED APPLICATIONS

This application claims priority to foreign French patent application No. FR 1601768, filed on Dec. 13, 2016, the disclosure of which is incorporated by reference in its entirety.

FIELD OF THE INVENTION

The invention relates to the technical field of embedded systems in avionics, and more particularly schemes and systems for managing an aircraft's logbook.

BACKGROUND

A "logbook" is a document which is found on board the cockpit of an aircraft. This logbook, paper or electronic, can log a great deal of information, of various types. It generally logs flight parameters and/or data (e.g. flight "logs", quantities of fuel, deicing data, miscellaneous reports) as well as maintenance parameters and data (e.g. management of defects noted on the aeroplane by the crew or the maintenance operators, maintenance history of the craft, etc.).

This particular document is the subject of several aeronautical regulations. In particular, it constitutes a unique reference, because of regulation. Today, the logbook—be it paper or electronic—is found physically on board the aeroplane. Its physical location compels sequential updating (i.e. one user after the other). A logbook, for example made of paper, generally comprises several leaves, with several carbon copies for each leaf, these carbon copies allowing the various users to have read-access to the technical state of the aeroplane. In order to be able to plan maintenance, which requires a consolidated technical state, each leaf used of the logbook is copied over manually into the airline's maintenance system. The paper original of the logbook is kept on board. It is this original which is updated by the crew and certain operators. The logbook actually logs the technical state of the aircraft which is taken into account by the pilot in his flight preparation, accepted before departure and updated as needed during the flight. Subsequent to these updates, and according to the planned maintenance on the aircraft, the maintenance operators report the maintenance operations performed to ensure the airworthiness of the aircraft. The circulation of the printed document is therefore constrained in space and/or in time, by following a series of steps whose scheduling is predefined. The electronic versions of the logbook transpose the paper version directly. The updates are done sequentially on board, the only difference being that the updating of the maintenance system is done electronically. In certain cases, these electronic versions allow remote consultations.

This information management (paper logbook or according to its transposition to electronic) exhibits limitations. The prior art describes various approaches for facilitating the manipulation of a logbook (in particular in its electronic version). These approaches solve certain technical problems but exhibit residual limitations. Existing procedures for updating the logbook continue in particular to compel the users to go on board the aircraft (and this may pose security or safety problems by increasing the number of operatives on board and/or involve additional delays). Sequential write-access may require the users to have to wait their turn, before being able to undertake an update. As far as the ground teams are concerned, they have access only to potentially obsolete and/or incomplete information (and in particular without being forewarned thereof), for example because of particular synchronization limitations and constraints (e.g. manual copyovers, etc.).

A need exists for systems and methods for managing the data logged in this logbook of regulated type.

SUMMARY OF THE INVENTION

There is described a method for managing an electronic logbook of an aircraft, comprising the steps consisting in agreeing or refusing a read and/or write request by a client post as a function of predefined criteria comprising criteria associated with predefined time intervals and network connectivity criteria. Developments describe the management of a degraded mode (for example in case of interruption and/or of the restoral of network connectivity, e.g. with notification of the client posts and/or local backup saves), criteria furthermore dependent on that part of the electronic logbook designated by the read and/or write request, security levels and/or priority levels. Encryption, integrity verification, network quality of service and distributed database aspects are described. Software and system aspects are described.

In certain embodiments, the invention combines steps of managing the logbook by locking of reading and/or writing and steps of managing network connectivity. Various embodiments describe the use of notifications, the use of time intervals to perform the synchronization, the use of caching, modalities of graphical interaction specifying the modifiable or non-modifiable information, etc.

In one embodiment, the invention relates to a method and a system for aiding decision for the management of the logbook of an aircraft.

Advantageously, the invention combines one or more mechanisms for read/write locking and one or more mechanisms for managing the state of the network connectivity. The locking mechanisms enable the various users to be guaranteed remote write-access to the logbook, while taking account of the responsibilities of each. This saves time and money by avoiding when possible the necessity for agents to go to the aircraft in order to update the logbook. The mechanism for managing the state of connectivity enables the company to continue to make use of the electronic logbook even in case of poor connectivity (savings of time for the users and of money for the airline).

Advantageously, the invention enables the users to avoid having to go on board the aircraft in order to update the logbook (e.g. gain as regards safety or security, time saving).

Advantageously, the invention makes it possible to avoid users being compelled to wait their turn patiently before being able to update the logbook (because of the sequential write-access). All the users save time and provide information when they so wish. The invention allows the updating of the logbook, in parallel and remotely, by users of different profiles and via various media (e.g. computers, telephones, tablets).

Advantageously, the invention allows the ground to access (e.g. via the maintenance system or by direct access to the application from the ground) updated and complete information, because of improved management of data synchronization. The invention allows access to complete and up-to-date information by any user (on board or on the ground), and while optionally notifying the user in case of obsolete information.

Advantageously, the logbook and its associated modes of management can lessen the pilot's cognitive burden, decreasing the time required for decision taking and consequently improving aircraft flight safety.

Advantageously, the embodiments of the invention allow the network connectivity to be taken into account (relating in particular to the read/write access to the logbook). The existing approaches may lead to divergences between the databases embedded respectively on the ground and on board.

Advantageously, the embodiments of the invention allow appropriate (i.e. secure) management of concurrent accesses and/or management of conflicts of access to the logbook and allow best synchronization of the data, given the connectivity losses ("degraded" modes).

Advantageously, an electronic logbook according to the invention can be used as tool for real-time communication between several air operatives (pilot and crew, maintenance operators). Advantageously, the electronic logbook according to the invention allows strengthened cooperation between ground teams and flight personnel. In particular, several users can use the logbook according to the invention, in read mode and in write mode, without needing to go on board the aircraft (thus allowing the company to save time and money). Advantageously according to the invention, the users will be able to use the logbook even in case of poor ground-to-air connectivity.

In one embodiment of the invention, accesses to the logbook can be controlled, synchronized and also be performed according to various modalities of man-machine interfaces (Web interfaces, augmented and/or virtual reality systems, etc.). Advantageously, customizations of access are allowed by the invention (for example, the read and/or write access interfaces can be customized according to the airlines (e.g. naming of the various manipulated objects, customization according to the airlines).

BRIEF DESCRIPTION OF THE DRAWINGS

Other characteristics and advantages of the invention will become apparent with the aid of the description which follows and of the figures of the appended drawings in which.

DETAILED DESCRIPTION

There is described a method for managing an electronic logbook of an aircraft, comprising the steps of:

agreeing or refusing a read and/or write request by a client post from among a plurality of the/in the said electronic logbook, as a function of predefined criteria comprising:

criteria associated with predefined time intervals governing the read and/or write entitlements of the client posts before, during and after the flight; and—criteria of network connectivity between one or more client posts and the database associated with the electronic logbook.

A user (e.g. pilot or maintenance operator) makes use of a client post (connected object e.g. computer, tablet, etc.). A user can form part of a group (user profile, function), category enjoying specific read and/or write privileges to the various databases.

The expression "A and/or B" designates three possibilities: conjunction (A and B) and two alternatives (A, B). The expression "read and/or write" signifies that a client post may ask to read the database (the log), without wishing to write to it. A client post may ask to write to the database, without requiring reading thereof. A client post may ask to read from and to write to the database (in both orders: first read and then write, or vice versa).

The term "agree" signifies, according to case, consent, give agreement to, authorize or unlock (access). The term "refuse" signifies, according to case, prohibit, reject, prevent or lock (access).

The criteria according to the invention are predefined but generally configurable. A criterion may be invariant or on the contrary variable. In certain embodiments, a criterion may be defined dynamically (for example as a function of another criterion). The "time intervals" are "phases". Other milestones may be added (open list). The network connectivity criteria are described hereinafter.

In one embodiment, the method furthermore comprises the step consisting in notifying a client post in case of interruption and/or of the restoral of network connectivity.

In certain embodiments, the evolutions of the state of the inter-client network and/or with the database instantiating the database can be signalled to the users. For example, network interruptions (factual data item) can be signalled, as can slowdowns (probability of cutoff).

In certain embodiments, for example in case of network interruption, a mean waiting time can be indicated to the user (this mean time may result from probabilistic analysis by consideration of past statistics).

In one embodiment, the determination of a network interruption triggers the local caching of the requests (and of the inputs of the said client post). Once network connectivity has been restored, the effective dispatching of the request (and/or of the input information), can also be notified to the user.

In certain embodiments, proactive measures can be determined. For example, a connection between two points enduring too many fluctuations as regards bandwidth might for example be considered to be insufficiently reliable and notified as such to the user concerned.

In one embodiment, the method furthermore comprises the step consisting in locally saving in the client post the request, in read mode and/or in write mode, as well as the information accompanying the said request. In one embodiment, in a "degraded" situation as regards the network (e.g. slowdown or interruption), the ground operators may for example continue to work and to store what they write (in "doodle" mode), at least temporarily.

In one embodiment, the method furthermore comprises the step consisting in notifying a client post in case of agreement or of refusal of its read and/or write request. Information feedback to the client post is entirely optional but is advantageous, in expectation of effective communication. On site, decisions may be deferred in time, in case of refusal for example.

In one embodiment, the read and/or write access entitlements are furthermore dependent on that part of the electronic logbook designated by the read and/or write request. A "part" may designate a document, a data item or a group of data of the logbook. Operations conducted at a fine granularity (data item, field, sections of the logbook) may make it possible to detect an inconsistency, if any, rapidly and precisely (and also to remedy it rapidly).

In one embodiment, the read and/or write access entitlements are furthermore dependent on a security level from among a plurality of predefined security levels. A security level can be associated with a client post (hardware characteristics of the connected object) and/or with the user (functional profile) sending a read and/or write request. In one embodiment, each of the client posts can be associated with a security level. In other embodiments, part of the client posts is characterized.

In one embodiment, the read and/or write access entitlements are furthermore dependent on a priority level from among a plurality of predefined priority levels. A (hierarchical) priority level defines the order in which the read and/or write accesses will actually be performed. The reading operations on the one hand and the writing operations can be managed in a distinct or differentiated manner. The priority levels are generally predefined. In one embodiment, the various priority levels associated with the various user profiles and databases are configurable (for example by the airlines). The management of priorities between the read and/or write requests makes it possible in particular to regulate conflicts or collisions. Logic rules can organize or govern these levels of priorities. Within one and the same security level, rules for managing collisions/conflicts can be implemented.

In one embodiment, the communications between one or more client posts and/or the database associated with the electronic logbook are encrypted. The transport of the data is advantageously encrypted, so as to forestall interceptions of data and/or their modification.

In one embodiment, the method furthermore comprises the step consisting in verifying the integrity of one or more parts of the electronic logbook. An integrity verification during accesses to the logbook (in its entirety or to one of its sub-parts) may turn out to be advantageous. Such integrity verifications then generally take place before and/or after accesses by the various operatives. Malicious manipulations or accidental errors may indeed occur.

In one embodiment, the network connectivity criteria comprise criteria indicative of the quality of service of the network. The network connectivity is generally alterable. Depending on network incidents, slowdowns, accelerations or interruptions, the network connectivity may vary in the course of time, between the database and the client posts, and also between the client posts. In one embodiment, the connectivity may be binary (network present or absent). In certain embodiments, the connectivity can be quantized or discretized (locally or globally). The connectivity can be associated with a graph. Measurements, in particular of availability, bitrate, transmission delay, jitter and rate of loss of information (historical or statistical, current or predictive information) can be associated with the graph or with the topology of the network (between the databases and the client posts).

The quality of service (QoS) designates the capacity to communicate under good conditions a given type of traffic, in terms of availability, bitrate, transmission delays, jitter, and rate of information loss. The aim of manipulating the network quality of service is to optimize the resources of a network and to guarantee the client or application posts good performance. The quality of service makes it possible in particular to offer users bitrates and response times that are differentiated by applications and/or according to the users (or else according to other criteria).

In one embodiment, the method furthermore comprises the step consisting in recording on a removable memory medium and/or in printing the logbook.

The electronic logbook does not generally coexist with a paper logbook. On the other hand, it is regulatory to leave a copy of the logbook on the ground before each flight. If it is not possible to leave an electronic version (for example in the absence of network connectivity or of synchronization), it is advantageous in a degraded mode to make a copy of the logbook (in its present state, i.e. in the last accessible state). This copy for example can be made electronically (e.g. on a removable medium of SD type or USB key card) and/or physically (e.g. paper printout).

In one embodiment, the electronic logbook is obtained from a paper logbook by one or more steps comprising a step consisting in recognizing a manuscript, a step consisting in optically recognizing printed characters after one or more acquisition of images of the said paper log, as well as steps of voice dictation. For example, a video camera (stream of images) and/or photographic equipment or an automated scanner can transcribe the paper logbook into its electronic equivalent.

In one embodiment, a client post is associated with a user, the said user being selected from among the users comprising a flight captain of the aircraft, a copilot, a maintenance operator of PART M type, a maintenance operator of PART 145 type.

In one embodiment, the predefined time intervals are determined between temporal milestones, these temporal milestones comprising the acceptance by the pilot of the technical status of the aircraft, the revision of the said acceptance ("break acceptance"), the approval for recommissioning ("maintenance release"), the instant from which the pilot becomes active on the mission and the signing of the technical status by the pilot at the end of the mission.

There is described a computer program product, the said computer program comprising code instructions making it possible to perform one or more of the steps of the method, when the said program is executed on a computer.

There is described a system for implementing the management of an aeronautical logbook, the said system comprising at least one first database hosted by a server located in the cockpit of the aircraft, the said first database instantiating the regulatory logbook. In a development, the system furthermore comprises at least one second database, the said database being synchronized with the first database. In a development, the system comprises a plurality of databases, the said databases being mutually synchronized. In a development, a client post being selected from among the client posts comprising a computer, a mobile telephone, a tablet, an electronic flight bag or a virtual and/or augmented reality device.

Examples of embodiments are described hereinafter.

Figure 1:
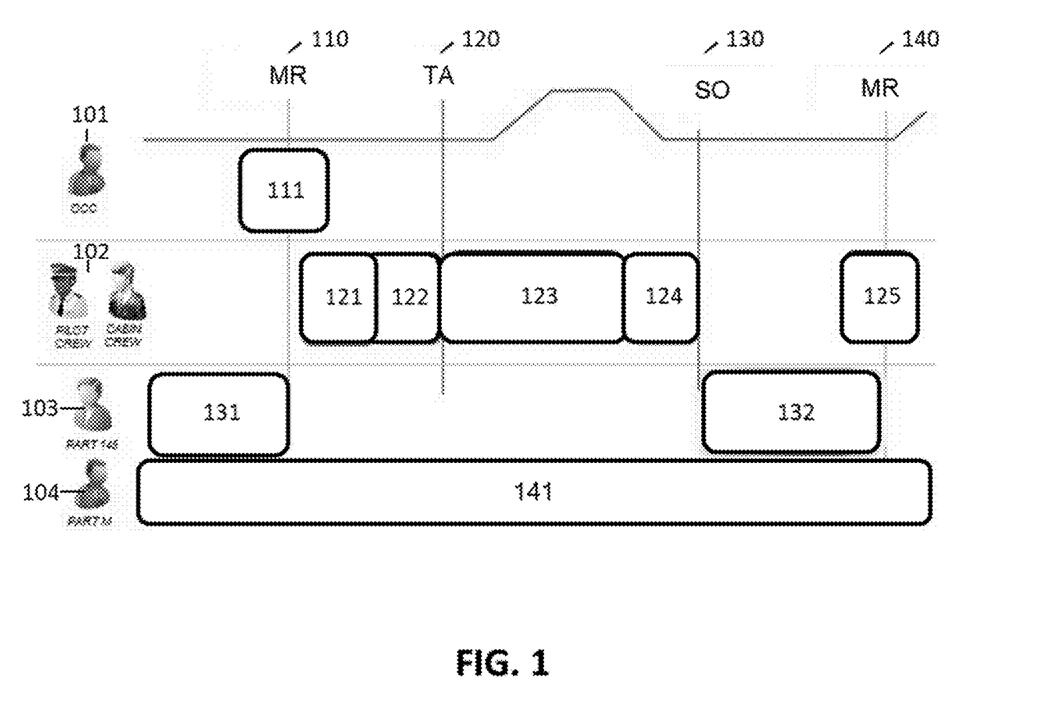
FIG. 1 illustrates examples of sequences of manipulation of a logbook according to the aeronautical regulation in force.

FIG. 1 illustrates examples of sequences of manipulation of a logbook according to the aeronautical regulation in force.

The logbook can be manipulated (reading and/or writing) by various operatives, in particular an operator of the control centre OCC 101, a pilot (e.g. the flight captain) or a member of the crew 102, a maintenance operator (of PART 145 type 103 or PART M type 104).

Various sequences are described hereinafter.

The preparation of the flight folder 111 ("Folder preparation") is performed by the OCC 101. He indicates therein whether any aircraft-related operational limitations exist.

The so-called "Flight briefing" phase 121 is performed by the crew which prepares its mission, taking account of the potential operational limitations associated with the aircraft.

The so-called "Preflight" phase 122 is performed by a member of the crew. The pilot decides whether or not to execute his mission with this aircraft. In the first case he formalizes this decision through the acceptance of the "technical state" of the aeroplane ("technical acceptance") 120. From this moment the crew becomes responsible for the logbook.

The so-called "Flight execution" phase 123 corresponds to the flight of the aircraft properly speaking: the crew logs the technical incidents, if any, encountered in the course of the progress of the mission in the logbook.

During the so-called "Post flight" phase 124, the crew make sure that all the incidents that might have an impact on the airworthiness of the aeroplane have been written in the logbook. They then close the logbook in the so-called "Sign off" step 130 (logbook closure).

Concerning the maintenance operations, the "Maintenance execution" phase 131 and 132 corresponds to the maintenance operations, carried out on the ground, which are necessary for maintaining the aircraft in or restoring it to a state of airworthiness (as a function of the planned maintenance operations and/or of the incidents raised by the crew). In certain cases, a flight may take place without there being any subsequent maintenance phase.

Before, during and after the flight a "Maintenance planning" phase 141 takes place during which the operators (e.g. PART M) plan the maintenance operations to be performed in order to maintain the aircraft in a state of airworthiness. The incidents raised by the pilot (or by maintenance in the course of planned maintenance operations) are also taken into account.

As described previously, the logbook is used by several users in the course of the various phases. Some have read-only needs (e.g. OCC, PART M), others have read- and write-needs (e.g. crew, PART 145).

These write-needs may be concurrent (i.e. the requests may be received or sent in parallel or substantially simultaneously). For example, the crew and the PART 145 operators may wish to modify the logbook at the same moment. Actually within the PART 145 team, conflicts or collisions may arise (several operators might intervene at the same time on an aircraft).

The embodiments of the invention facilitate and enrich this regulatory management flow.

Figure 2:
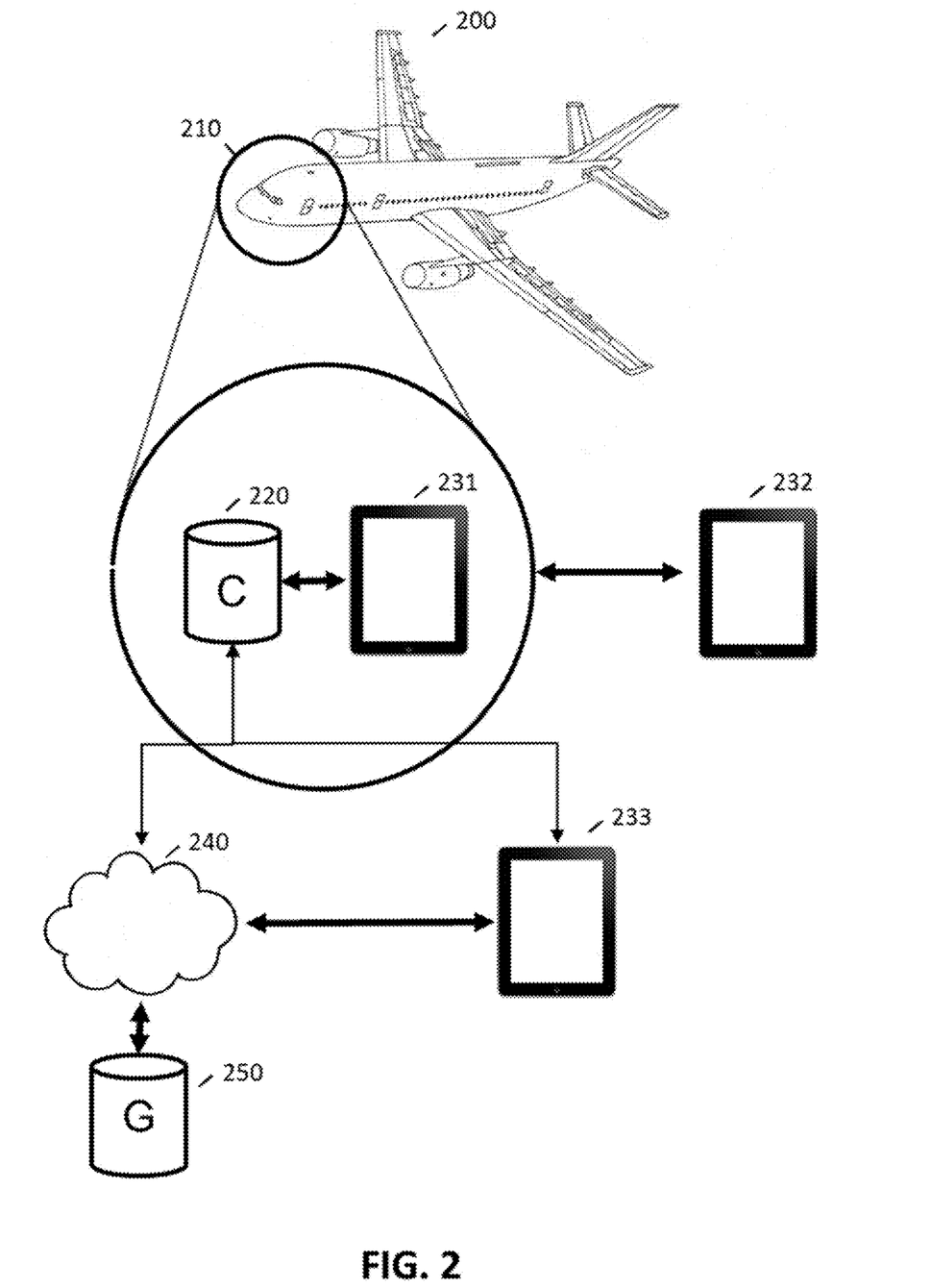
FIG. 2 illustrates examples of systems for implementing the method according to the invention.

FIG. 2 illustrates examples of systems for implementing the method according to the invention.

An aircraft 200 comprises a cockpit 210. In the cockpit is situated the logbook 200 (denoted C for "Cockpit"). This electronic logbook is accessible from various clients, for example 231, 232, 233. A client can be a computer, a mobile telephone, a tablet or an electronic flight bag, a virtual reality headset, augmented reality equipment, etc. Network accesses can be performed by one or more networks chosen from among 2G, 3G, 4G, 5G, Wifi, Bluetooth (e.g. BLE) wireless networks or proprietary networks. In flight, a network of SATCOM type can be used. Certain communication segments can use wired networks (e.g. internal to the aeroplane or between the maintenance team and the cockpit via an interface connectable from outside, e.g. using fibre, cables), the use of a wired network minimizing the risk of interception. The exchanges can be authenticated and/or encrypted. A second logbook 250 can be read/write accessed. This second logbook denoted G for "Ground" is a copy of the logbook C 220 present in the cockpit. This copy G is synchronized with the log C, via the network 240. Computing resources (e.g. calculation, storage) can be accessed remotely via the network 240. The figure illustrates the diversity of accesses that can be performed to read from and/or write to the logbooks. Certain connections are direct (231, 220), certain are short-range indirect (232, 220), certain are via the network 240 (233, 220, 240, 250). The computing architectures can be centralized (the logbook C can be a database implemented in a server located physically in the cockpit) and/or decentralized or distributed (for example the logbook G can be a database distributed in the client equipment of the maintenance operators).

Various mechanisms specific to the invention can be implemented in this system (and its variants). Indeed, according to the embodiments of the invention, various mechanisms can be combined, for example one or more mechanisms for locking (reading/writing) the logbook, in particular as a function of the flight/maintenance phases and/or of the user profiles (access entitlements), and also as a function of the state of the network connectivity.

Figure 3:
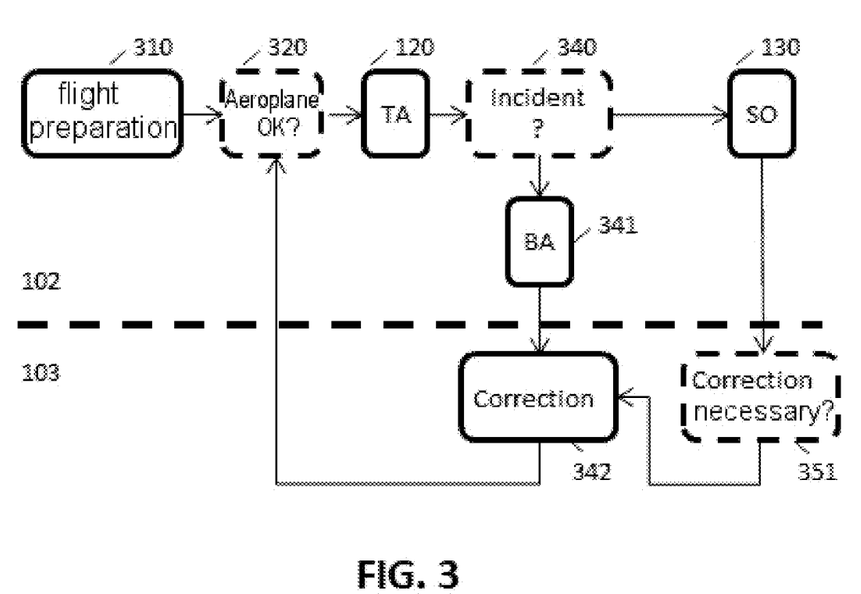
FIG. 3 illustrates certain aspects of the invention which relate to the locking mechanism.

FIG. 3 illustrates certain aspects of the invention which relate to the locking mechanism.

Before technical acceptance 120, the pilot 102 prepares the flight. If the aircraft is not in an acceptable state of airworthiness 320, then corrections or maintenance operations 342 can be performed on the aircraft.

After technical acceptance 120, the logbook is under the responsibility of the flight captain 102 until the Sign Off step 130. During this time span, the PART 145 operators must not be able to write-access the logbook. The method according to the invention comprises a step consisting in write-locking the logbook for any PART 145 profile operator, between the technical acceptance 120 on the part of the flight captain until the Sign Off step 130. Before technical acceptance 120 or after Sign Off 130, the operators have write-access to the logbook.

It may happen that a defect is identified after technical acceptance 120 whilst the aeroplane is still on the ground. This defect, if it can be corrected rapidly by maintenance, does not necessarily call into question the mission with this aircraft. It may then be useful for the crew to hand over to maintenance, but without closing the flight through a Sign Off 130.

In one embodiment, the flight captain may revise his decision to accept the technical status of the craft (revision of technical acceptance 241 or "Break Acceptance", acronym BA). This decision may be motivated by an incident 340. If relevant, once such an action has been taken by the flight captain, the PART 145 operators have write-access to the logbook again, and can then report maintenance actions therein (past or in progress).

The flight captain can thereafter accept (or not) in step 330 the new technical state of the aeroplane in order to accomplish his mission (for example after a correction 342 and then a re-examination of the situation by the pilot 320).

In one embodiment of the invention, the possibility of the pilot undertaking a revision of the technical acceptance 341 may be conditioned upon the fact that the aeroplane is still on the ground.

By performing the Sign Off 130, the crew stipulates that all the incidents noted and having an impact on the airworthiness of the aircraft have been reported or logged. Subsequent to "Sign Off" 130, the crew should then no longer be able to access the logbook. In one embodiment of the invention, the logbook can be write-locked for the crew, once mission "Sign Off" 130 has been performed.

In one embodiment, three main milestones define the logbook management phases: acceptance of the technical status of the aircraft 120 ("technical acceptance" or TA), Sign Off 130 and the possibility of the pilot reconsidering technical acceptance ("break acceptance" 341). In certain embodiments, a plurality of additional milestones are taken into account, so as to facilitate more precise management of the read and/or write entitlements. For example, milestones of "maintenance release" (approval for recommissioning) or of "sign in" can determine the moments from which the operators declare the end of their operations or the pilot considers himself to be active on his mission.

Read- and/or write-locking mechanisms can tailor logbook management for the time intervals bounded by the above-described milestones (or others not represented).

Figure 4:
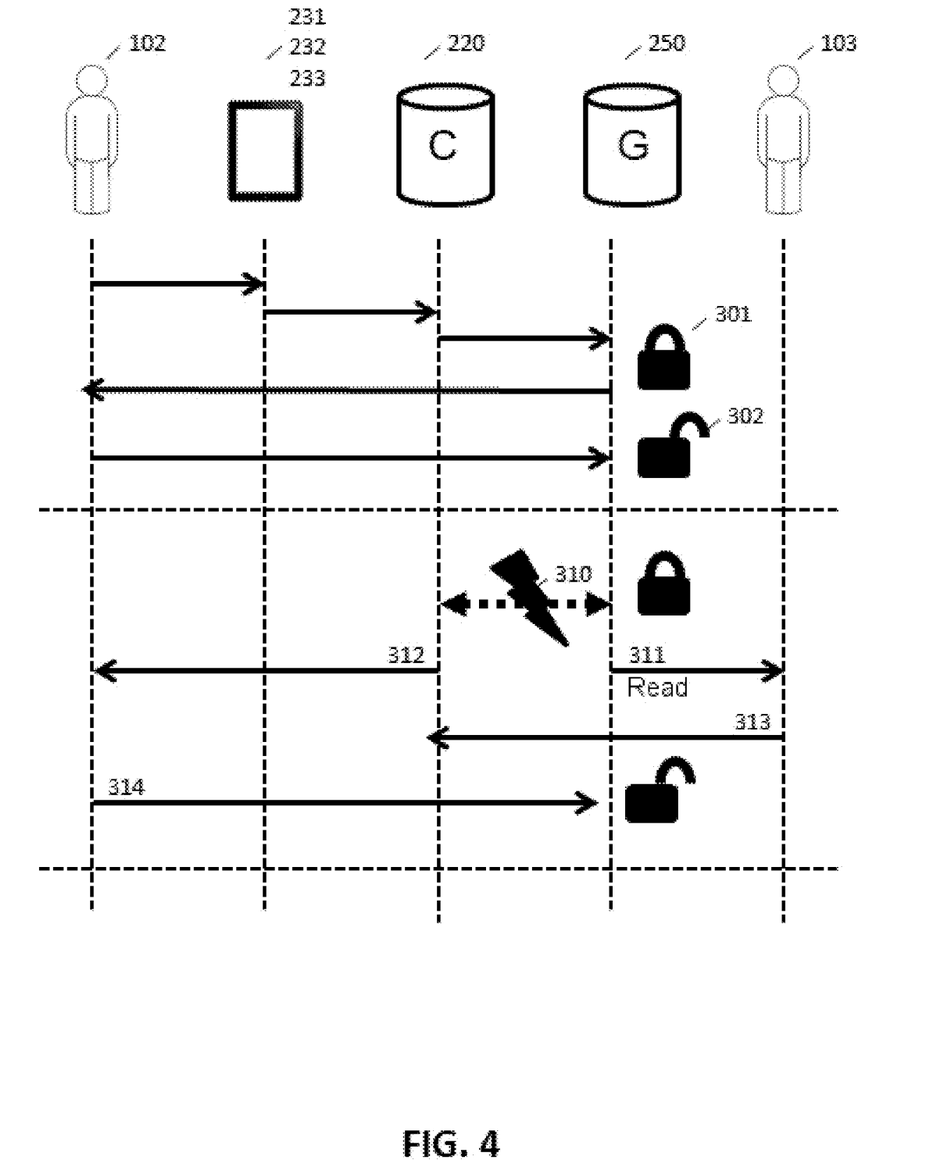
FIG. 4 illustrates certain aspects of the invention which relate to the management of connectivity.

FIG. 4 illustrates certain aspects of the invention which relate to the management of connectivity.

The locking mechanism described above operates only within the framework of perfect connectivity between the various operators.

Within the framework of partial connectivity, this mechanism is functional only if it is supplemented with a synchronization mechanism. This synchronization according to the invention may in particular be conditional, in particular be dependent on the state of connectivity between the logbook and one or more of its clients.

In one embodiment, the logbook can be implemented in a single database, i.e. the "original" or "regulated" database 220 (in the cockpit). This configuration is more demanding as regards connectivity. Stated otherwise, if the communication is broken between the server and a client, the envisaged flight operations are interrupted.

In one embodiment, the logbook can be implemented in several databases, for example in the "original" or "regulated" database 220 (in the cockpit) and/or a "copy" or "cache" 250 (for example on the ground). This configuration is more advantageous as regards connectivity, since if one of the databases is no longer accessible, the other can continue to receive writes and/or deliver information. For example, if there is no longer any connectivity between the aeroplane and the ground, a user situated on the ground can still consult the technical state of the aeroplane by consulting the database on the ground.

In the case where a plurality of databases is implemented, the various databases can be maintained in a state of mutual consistency, in particular by using read and/or write entitlements. For example, if the flight captain has proceeded to technical acceptance, it is not necessary for a ground operator to be able to access the application in write mode. Hence, if connectivity between the databases is ensured, they can synchronize with one another. For example, the captain's acceptance can be transmitted to the ground by synchronization. The maintenance operator will then not be able to write-access the on-board database, or the ground database.

In one embodiment, should there be a break in ground-to-air connectivity, a single database can become the reference database. The other databases, if relevant, are then read-only restricted. Optionally, a user connecting to these bases can be informed or notified of the state of the network, or in greater detail of the various information that may (or may not) be modified. Messages informing that the data may be obsolete (and/or become obsolete) may be provided, and the said information may be indicated. If estimations relating to the network and/or to the operator procedures are available (statistics for example), a mean waiting time may be indicated. The caching of information input by an operator may also be indicated (and actual dispatch if relevant may be notified).

FIG. 4 shows a few examples of scenarios illustrating the management of connectivity additionally to the phases of management, according to the invention, of the logbook. In the example, the database considered to be the reference database is the database C 220.

In one embodiment (offline mode i.e. with no network access), the locking mechanism can be eased: write-accesses to a local database may be authorized. To avoid synchronization between two inconsistent databases, a conditional synchronization can be implemented.

In one embodiment, a conditional synchronization consists in synchronizing data while taking account of the state of the receiving database: to write to the receiving database, it is necessary for the author of the updates to have the write-entitlements to this database. For example an offline update of a crew member 102 might not be synchronized with the database C if Sign Off has already been performed.

FIG. 4 illustrates a few examples of connectivity management in a system implementing the method according to the invention. In a first example, the pilot 102 by using a tablet 231 modifies the logbook C 220, which is synchronized with his ground copy G 250. This ground copy may for example be locked 301 (if the pilot has not expressed his technical acceptance, the database may remain in an unlocked state). In an example, a PART 145 maintenance operator 103 may wish to modify the log G and to dispatch a request in this regard to the pilot, who may accept the write-request: the pilot unlocks 302 the log G (but keeps the log C in a locked state). Still according to the example, the communication is interrupted 310 between the log C and the log G, the latter being in a locked state. This loss of connection is notified 312 to the pilot 102, who must wait for communication to be restored in order to be able to unlock the log G. In the interval, read-access 311 to the log G continues to be effective on the part of the ground operators, who can temporarily store their modifications locally in their equipment (e.g. 232 or 233), until the communication is restored and until the log G is updated 313. The pilot can then unlock 314 write-access to the log G.

The pilot can generally unlock the log by undertaking a revision of the technical acceptance or again becoming active on the mission ("sign-off").

More generally, employing a plurality of databases makes it possible to improve the management of connectivity. In the extreme, a large number of databases makes it possible to improve the management of the offline modes.

The modalities of synchronization of the various databases may be diverse. The databases may be updated in mirror mode (incremental, differential, complete updates, etc.). The databases may be of the same rank, or on the contrary of slaved or hierarchical manner. The databases may be redundant to avoid or lessen possible data losses. The communications between databases may be performed in a regular manner (for example independently of the read/write events) or be intermittent, or else in an opportunistic manner (when the bandwidth allows effective communications, or when ad hoc networks allow good transmissions). In one embodiment, an upward synchronization (from a client to the server hosting the logbook) may be blocked (or prevented or interrupted or forestalled or prohibited), for example in case of absence of connectivity between the on-board server and the ground server (or if connectivity is deemed insufficient, for example in relation to predefined thresholds, for example as a function of quality of service criteria). A connection enduring too many fluctuations as regards bandwidth might for example be considered to be insufficiently reliable. In one embodiment, upward synchronization (from a client to the server hosting the logbook) may be blocked in case of differences (e.g. thresheld) between the state of the server and that of the client.

Various developments or embodiments are described hereinafter.

In one embodiment, there is described a method implemented by computer for managing a logbook of an aircraft comprising the steps consisting in: receiving a request for modification of a client (post) of one or more elements of the electronic logbook hosted in a server embedded on board the aircraft; the client being operated by the pilot, the copilot or a maintenance operator; determining the read and/or write entitlements of the said client post relating to the said one or more elements; the said entitlements being determined according to predefined time intervals; if relevant, modifying the logbook, locking access to the logbook and signalling as such that access is locked; synchronizing the logbook with the various client posts.

In a development, i.e. in combination with the characteristics specific to the electronic logbook according to the invention, photos and videos can be logged or recorded or stored, within the logbook or in association with the latter. In order to guide to advise to assist the pilot in his task of describing the state of the craft, and also so as to facilitate the work of the maintenance teams downstream, one or more predefined lists may be proposed for selection. For example, the crew may be able to add multimedia elements (photo video sound-band), in order to contextualize the signalled problems. After the flight, recordings relating to the quantity of fuel on arrival may also be performed.

In one embodiment, the method may also comprise information processing steps which may for example allow the automatic identification of limitations or of constraints, such as constraints of "ETOPS" type.

Certain aspects relating to the embodiments of the invention are described hereinafter.

The present invention may be implemented on the basis of hardware elements and/or software elements. It may be available in the guise of computer program product on a computer readable medium. The medium may be electronic, magnetic, optical or electromagnetic.

The computing means or resources may be centralized and/or be distributed ("Cloud computing"), optionally with or according to peer-to-peer technologies and/or virtualization technologies and/or redundancy technologies. The software code may be executed on any appropriate processor (for example, a microprocessor) or processor core or a set of processors, be they provided in a single calculation device or distributed among several calculation devices. The computerized implementation of the invention may use centralized systems (e.g. client-server or master-slave) and/or distributed systems (e.g. architecture of peer-to-peer type using computing resources that can be accessed, possibly in an opportunist manner e.g. ad hoc networks, etc.).

The system (or its variants) implementing one or more of the steps of the method can use one or more dedicated electronic circuits or a general-purpose circuit. The method can also be implemented on a reprogrammable calculation machine (a processor or a microcontroller, for example) executing a program comprising a sequence of instructions, or on a dedicated calculation machine (for example a set of logic gates such as an FPGA or an ASIC, or any other hardware module). A dedicated circuit may in particular accelerate performance, for example as regards access to the logbook. By way of exemplary hardware architecture suitable for implementing the invention, a device may comprise a communication bus to which are linked a central processing unit (acronym CPU) or microprocessor, which processor may be "multi-core" or "many-core"; a read-only memory (acronym ROM) being able to comprise the programs required for the implementation of the invention; a random-access memory or cache memory (acronym RAM) comprising registers suitable for recording variables and parameters created and modified in the course of the execution of the aforementioned programs; and a communication or I/O interface (the acronym standing for "Input/Output") suitable for transmitting and for receiving data.

In the case where the invention is implanted on a reprogrammable calculation machine, the corresponding program (that is to say the sequence of instructions) may be stored in or on a removable storage medium (for example a flash memory, an SD card), a mass storage means such as a hard disc e.g. an SSD) or non-removable, volatile or non-volatile medium, this storage medium being partially or totally readable by a computer or a processor.

The reference to a computer program which, when it is executed, performs any one of the functions described above, is not limited to an application program executing on a single host computer. On the contrary, the terms computer program and software are used here in a general sense to refer to any type of computer code (for example application software, micro software, a microcode, or any other form of computer instruction) which can be used to program one or more processors in order to implement steps of the method.

The invention claimed is:

1. A method for managing an electronic logbook of an aircraft, comprising the steps of:
    on a computer located in a cockpit of an aircraft implementing a server hosting at least one first database, the said at least one first database instantiating said electronic logbook, refusing a read and/or write request by a client post from among a plurality of the/in the said electronic logbook, as a function of predefined criteria comprising:
        criteria associated with predefined time intervals determined between temporal milestones governing read and/or write access entitlements of the client posts during a flight; and
        criteria of network connectivity between one or more client posts and a database associated with the electronic logbook,
        wherein said client post is associated with one of a plurality of user categories, and
        wherein each said user category is assigned read and/or write privileges with respect to each said predefined time interval, and
    synchronizing said electronic logbook with a second database hosted on a server hosted on one or more further computers outside said aircraft,
    wherein the temporal milestones comprise at least one of the following: an acceptance by a pilot of a technical status of the aircraft, a revision of the said acceptance, an approval for recommissioning, an instant from which the pilot becomes active on a mission, sign-in by a pilot, and/or a signing of the technical status by the pilot at an end of the mission.

2. The method according to claim 1, further comprising the step of notifying a client post in case of interruption and/or of restoral of network connectivity.

3. The method according to claim 2, further comprising the step of locally saving in the client post the request, in read mode and/or in write mode, as well as information accompanying the said request.

4. The method according to claim 2 comprising the further steps of at least one of the following: performing a maintenance action and/or performing a pilot action on said aircraft on a basis of a content of said electronic logbook.

5. The method according to claim 1, further comprising the step of notifying a client post in case of agreement or of refusal of its read and/or write request.

6. The method according to claim 1, wherein the read and/or write access entitlements being further dependent on that part of the electronic logbook designated by the read and/or write request.

7. The method according to claim 1, wherein the read and/or write access entitlements being further dependent on a security level from among a plurality of predefined security levels.

8. The method according to claim 1, wherein the read and/or write access entitlements being further dependent on a priority level from among a plurality of predefined priority levels.

9. The method according to claim 1, wherein communications between one or more client posts and/or the database associated with the electronic logbook are encrypted.

10. The method according to claim 1, further comprising a step of verifying an integrity of one or more parts of the electronic logbook.

11. The method according to claim 1, wherein the criteria of network connectivity comprising criteria indicative of a quality of service of a network.

12. The method according to claim 1, further comprising a step of recording on a removable memory medium and/or in printing the electronic logbook.

13. The method according to claim 1, wherein the said user category being selected from among the user categories comprising a flight captain of the aircraft, a copilot, and a maintenance operator of a first type or second type.

14. The method according to claim 1, wherein the temporal milestones comprise the acceptance by a pilot of a technical status of the aircraft, the revision of the said acceptance, the approval for recommissioning, the instant from which the pilot becomes active on a mission, and the signing of the technical status by the pilot at an end of the mission.

15. The method according to claim 1 wherein said temporal milestones correspond to a submission by a user having an appropriate entitlement of a predefined write operation during a preceding time interval.

16. The method according to claim 1 comprising the further steps of performing a maintenance action or performing a pilot action on said aircraft on a basis of a content of said electronic logbook.

17. A non-transitory computer program product, the said non-transitory computer program product comprising code instructions to perform a method for managing an electronic logbook of an aircraft when the said non-transitory computer program product is executed on a computer, the code instructions comprising:
   on a computer located in a cockpit of an aircraft implementing a server hosting at least one first database, the said at least one first database instantiating said electronic logbook, refusing a read and/or write request by a client post from among a plurality of the/in the said electronic logbook, as a function of predefined criteria comprising:
      criteria associated with predefined time intervals determined between temporal milestones governing read and/or write access entitlements of the client posts during a flight; and
      criteria of network connectivity between one or more client posts and a database associated with the electronic logbook,
      wherein said client post is associated with one of a plurality of user categories, and
      wherein each said user category is assigned read and/or write privileges with respect to each said predefined time interval, and
      synchronizing said electronic logbook with a second database hosted on a server hosted on one or more further computers located outside said aircraft,
   wherein the temporal milestones comprise at least one of the following: an acceptance by a pilot of a technical status of the aircraft, a revision of the said acceptance, an approval for recommissioning, an instant from which the pilot becomes active on a mission, sign-in by a pilot, and/or a signing of the technical status by the pilot at an end of the mission.

18. A system for implementing management of an electronic logbook of an aircraft, said system comprising:
   one or more computers implementing a server hosting at least one first database, the said at least one first database instantiating said electronic logbook, said one or more computers being configured to perform the steps of:
   refusing a read and/or write request by a client post from among a plurality of the/in the said electronic logbook, as a function of predefined criteria comprising:
      criteria associated with predefined time intervals determined between temporal milestones governing the read and/or write access entitlements of the client posts during a flight; and
      criteria of network connectivity between one or more client posts and a database associated with the electronic logbook,
      wherein said client post is associated with one of a plurality of user categories, and
      wherein each said user category is assigned read and/or write privileges with respect to each said predefined time interval; and
   said system further comprising one or more further computers implementing a server hosting at least one second database and located in a cockpit of an aircraft, the said at least one second database instantiating said electronic logbook, the said at least one second database being synchronized with the at least one first database,
   wherein the temporal milestones comprise at least one of the following: an acceptance by a pilot of a technical status of the aircraft, a revision of the said acceptance, an approval for recommissioning, an instant from which the pilot becomes active on a mission, sign-in by a pilot, and/or a signing of the technical status by the pilot at an end of the mission.

19. The system according to claim 18, comprising a plurality of databases, the said databases being mutually synchronized.

20. The system according to claim 18, comprising a plurality of client posts, a client post being selected from among the client posts comprising a computer, a mobile telephone, a tablet, an electronic flight bag, a virtual reality device, and/or an augmented reality device.

* * * * *